United States Patent [19]

Rizzo

[11] Patent Number: 4,752,775

[45] Date of Patent: Jun. 21, 1988

[54] CODED MESSAGE REMOTE COMMUNICATION SYSTEM

[75] Inventor: Corrado Rizzo, Padova, Italy

[73] Assignee: Veltronic S.p.A., Padova, Italy

[21] Appl. No.: 765,533

[22] Filed: Aug. 14, 1985

[30] Foreign Application Priority Data

Aug. 14, 1984 [IT] Italy .............................. 84123 A/84

[51] Int. Cl.⁴ ........................ G05B 23/02; G08C 19/00

[52] U.S. Cl. ........................... 340/825.06; 340/825.72; 340/825.17

[58] Field of Search ....................... 340/825.06, 825.72, 340/825.69, 825.31, 825.07, 310 R, 825.16, 825.17

[56] References Cited

U.S. PATENT DOCUMENTS 3,861,134 1/1975 Chacon et al. ........................ 368/48

4,057,785 11/1977 Furniss et al. .................. 340/825.06

4,086,568 4/1978 Watts, Jr. et al. ............. 340/825.06

4,173,754 11/1979 Feiker ............................. 340/310 R 4,334,221 6/1982 Rosenhagen et al. ......... 340/825.72

*Primary Examiner*—Robert L. Griffin

*Assistant Examiner*—Ralph E. Smith

*Attorney, Agent, or Firm*—Birch, Stewart, Kolasch & Birch

[57] ABSTRACT

An electronic apparatus particularly suitable for processing, memorizing, utilizing and returning electrical signals and coded messages, includes essentially two sections (A, B), the first (A) constituting a self-contained, self-powered information unit provided with circuits for the wired or wireless reception of coded messages, decoding circuits for said messages, and monitoring circuits and/or circuits for automatically checking correct operation, the second (B) constituted essentially by a plurality of different units (B1, B2, B3, B4) to which, singularly and/or simultaneously, the first section (A) can be connected for the transfer, processing, recording and utilization of the signals provided by said section (A) in relation to the specific function to be performed, and for the deactivation of said section (A).

9 Claims, 2 Drawing Sheets

B
B1
1
2
42
43
12.1
44
H

B2
2
5
45
M
47
12.2
46
B3
1
48
+
=
49
12.3
7
8
50
B4
54
53
52
TX 56
2
5
51
57
12.4
9
10
55
RC 58

CODED MESSAGE REMOTE COMMUNICATION SYSTEM

BACKGROUND OF THE INVENTION

This invention relates to an electronic apparatus particularly suitable for the processing, memorizing and returning of electrical signals and coded messages.

With the continual development of electronic technology, there is an ever-increasing use of apparatus arranged to perform transmission, processing, memorizing, retransmission, electrical signal return and coded message return functions. Such apparatus are used in the most widespread sectors, including remote surveillance, remote control, monitoring, self-checking etc.

Normally, an apparatus is constructed to provide precise services, and for this reason is designed for specific applications of classes of application which require those particular services. If the application changes, such apparatus must of necessity undergo complete modification, and each of them becomes only partly utilized in consequence.

It has also been proposed to combine several apparatus into a single apparatus able to perform several functions, but obviously such a method becomes excessively burdensome in terms of constructional complexity, cost and overall size in all those cases requiring only some of the services which the apparatus is able to offer.

OBJECTS OF THE INVENTION

An object of the invention is to provide an apparatus of the initially indicated type, which is able to perform all the services required by the user.

A further object of the invention is to provide an apparatus which can increase the number of functions performed by simply adding parts, without the pre-existing parts requiring modification, alteration or replacement.

A further object of the invention is to provide an apparatus which is of secure and reliable operation under any condition of use.

A further object of the invention is to provide an apparatus able to supply a chronological documentation of the events being monitored.

A further object of this invention is to provide an apparatus which ensures privacy of the effected transmissions, whether these transmissions are made by direct connection or by electromagnetic wave propagation.

All these objects are attained according to the invention by an electronic apparatus particularly suitable for processing, memorizing, utilizing and returning electrical signals and coded messages, characterized by comprising essentially two sections, the first constituting a self-contained, self-powered information unit provided with circuits for the reception of coded messages via wire and/or via the airwaves, decoding circuits for said messages, and monitoring circuits and/or circuits for automatically checking the correct operation, the second constituted essentially by a plurality of different units to which, singularly and/or simultaneously, the first section can be connected for the transfer, processing, recording and utilization of the signals provided by said section in relation to the specific function to be performed, and for the deactivation of said section.

Advantageously the apparatus can comprise means for decoding and identifying received coded messages, means for comparing said messages with messages contained in its own non-volatile memories, and means for transferring the results of the effected comparison to user devices pertaining to said first section and/or to said second section.

Again according to the invention, the second section can comprise a unit to which the first section can be connected, said second section being provided with means for causing said memories to be read, and for making the possibly processed results of said reading available.

Advantageously the first section can comprise a unit which itself comprises subunits arranged to recognize coded messages received from another unit of the same section, each subunit comprising a non-volatile memory containing a previously inserted code, an ordering circuit arranged to provide a signal sequence corresponding to the recognized code, an amplifier circuit arranged to provide at its output a signal corresponding to the recognised code, and possibly a detector circuit arranged to provide at its output a differential signal corresponding to recognition or non-recognition.

Advantageously, the second section can comprise a unit which, independently of the unit of the first section, is able to receive coded messages and to compare them with any message decoded and recognised by the unit, in order to provide at its output a signal denoting recognition or non-recognition.

Again according to the invention, the second section to be used for remote control functions can comprise a unit including at least one decoder for the messages recognised by the subunits, and acting on an amplifier for controlling an external user device.

Advantageously, the second section can comprise an apparatus for the processing, monitoring, recording and direct and/or retransmitted signalling of the signals denoting recognition of the coded messages received from the section output, and of the signals generated by the section.

BRIEF DESCRIPTION OF THE DRAWINGS

The present invention is further clarified hereinafter in terms of a preferred embodiment with reference to the accompanying drawings in which.

DESCRIPTION OF THE PREFERRED EMBODIMENTS

Figure 1:
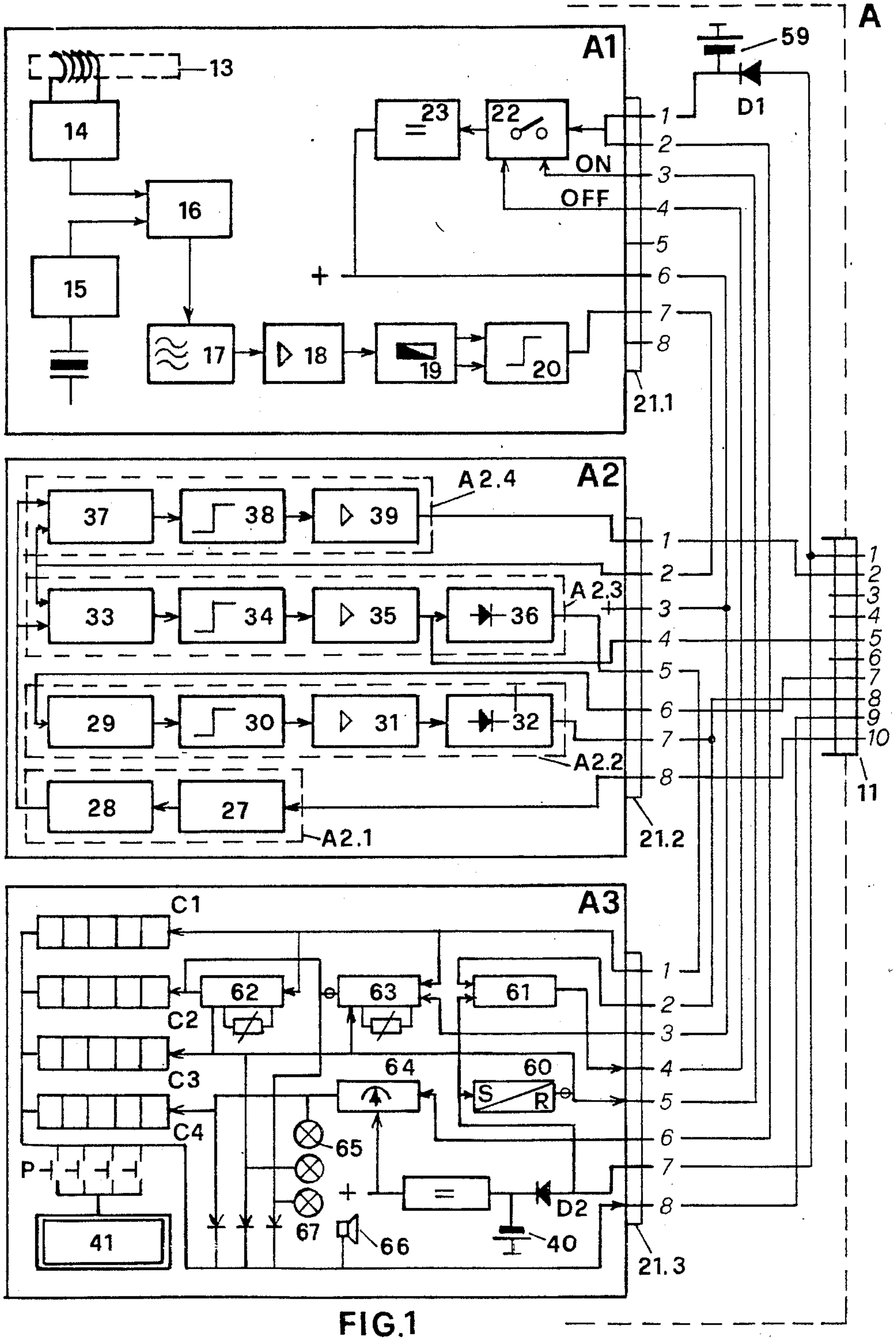
FIG. 1 illustrates diagrammatically the first section of the apparatus according to the invention.
Figure 2:
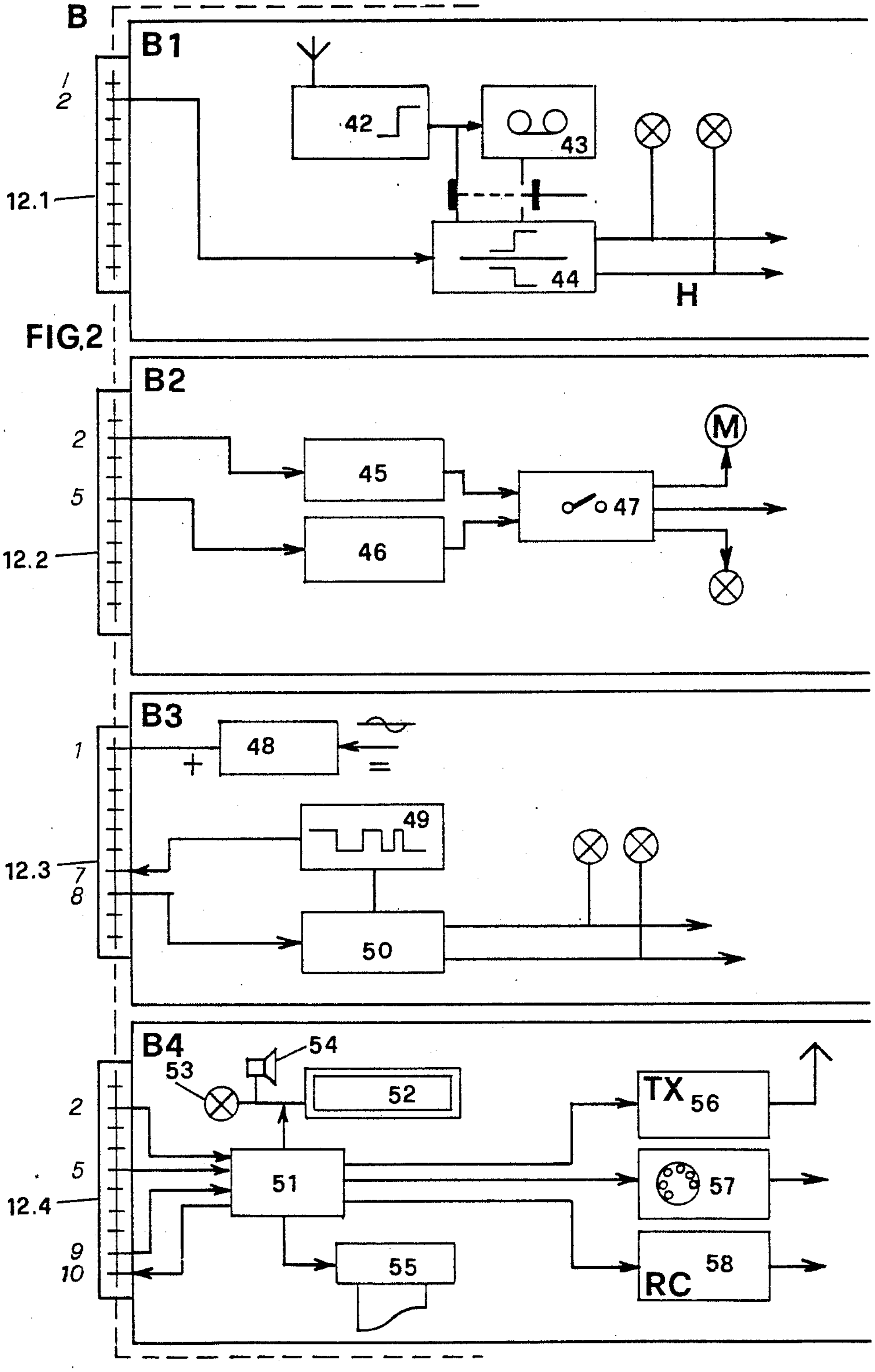
FIG. 2 illustrates the second section.

As can be seen from the drawings, the apparatus according to the invention can be illustrated schematically as two separate sections indicated overall by A and B. The section A is itself divided into three units A1, A2, A3, which are simultaneously present and suitably connected together and to a common connector 11. The section B is in reality constituted by a plurality of units B1, B2, B3, B4 which in the illustrated embodiment are shown as four in number merely to indicate four possible functions which the apparatus is able to perform. Each unit B1, B2, B3 and B4 is provided with a connector 12.1, 12.2, 12.3, 12.4, which can be connected to the connector 11 of the section A.

The unit A1 of the apparatus according to the invention constitutes essentially a radio frequency receiver. It comprises an antenna 13 with its amplifier 14 and a local oscillator 15, which are connected to the input of a mixer 16. The output of the mixer 16 is connected by way of a band-pass filter 17 and an intermediate frequency amplifier 18 to a discriminator 19, which is itself connected to a code formulator-reconstructor 20, the output of which is connected to the pin 7 of the connector 21.1, with which the unit is provided. The unit A1 also comprises an ON-OFF switch 22 and a voltage stabiliser 23 arranged to power the unit A1 and the unit A2, and to provide, by way of the pin 3 of its connector 21.3, the voltage signal to the unit A3 for the purpose to be described hereinafter.

The unit A2 comprises four different subunits A2.1, A2.2, A2.3 and A2.4 for logic signal treatment.

More particularly, the subunit A2.1 comprises a counter 27 with its input connected to the pin 8 of the connector 21.2, and its output connected to a register selector 28.

The subunit A2.2. comprises a memory 29 with its input connected to the pin 6 of the connector 2.2 and its output connected, by way of an ordering circuit 30, amplifier 31 and rectifier 32, to the pin 7 of said connector 21.2.

The subunit A2.3. is similar to the subunit A2.2, i.e. comprises a memory 33 with one input connected to the pin 2 of the connector 21.2, and its output connected by way of an ordering circuit 34, amplifier 35 and rectifier 36 to the pin 5 of the connector 21.2. In contrast to the subunit A2.2, in the subunit A2.2, a second input of the memory 33 is directly connected to the output of the register selector 28 of the subunit A2.1, and the output of the amplifier 35 is also directly connected to the connector 21.2 (pin 4).

The subunit A2.4 comprises a memory 37 with one input connected to the pin 2 of the connector 21.2, another input connected to the output of the register selector 28, and its output connected by way of an ordering circuit 38 and amplifier 39 to the pin 1 of the connector 21.2.

The unit A3 constitutes a self-contained unit provided with a self-rechargeble battery 40 and is responsible for the functional and operational supervision of the entire section A, as will be more apparent hereinafter. It comprises four counters C1, C2, C3, C4 which are connected by pushbuttons P to a display unit 41 and also connected to optical and acoustic signalling devices for indicating the events being monitored. The inputs of the counters C1, C2, C3 and C4 are connected to the pins of the connector 21.3 directly and/or by way of logic circuits which enable the scheduled monitoring functions to be performed, and which will be referred to as required during the course of the description of operation.

As stated, the section B is in reality constituted by several separate and self-contained units B1, B2, B3, B4, each able to receive via their connector 12.1, 12.3 and 12.4 the connector 11 of the section A in order to connect them together for the purpose of performing the predetermined functions.

In particular, the unit B1 comprises a self-contained receiver 42 complete with decoder, having its output connected to the input of a recorder 43 and to one of the inputs of a comparator 44, the other input of comparator 44 being alternatively connected to the output of the recorder 43. The other input of the comparator 44 is connected to the pin 2 of the connector 12.1. The two outputs of the comparator 44, corresponding to the states of coincidence and non-coincidence between the signal received through the pin 2 and the signal received from the receiver 42, or alternatively from the recorder 43, are displayed by means of a luminous signalling device and are also transferable to the outside for any further use.

The unit B2, arranged to perform remote control functions, comprises essentially decoders 45 and 46 (two in the particular illustrated embodiment) with their input connected respectively to the pin 2 and pin 5 of the connector 12.2 and their outputs connected to an amplifier cicuit 47 which provides as output an electrical signal for the required remote control use.

The unit B3 constitutes essentially a power unit and a mutual recognition unit with the section a. It comprises a power pack 48 with its output connected to the pin 1 of its own connector 12.3, and a code generator 49 with one ouput connected to the pin 7 and another output connected to one input of the comparator 50, the other input of which is connected to the pin 8 of said connector 12.3. The two coincidence and non-coincidence outputs of the comparator 50 are displayed by a luminous signalling device and can also be transferred externally for any further use.

The unit B4 constitutes essentially a monitoring unit for an automatic data processing center. It comprises a system 51 for processing logic signals and a series of peripheral devices constituted for example by alphanumerical display devices 52, optical signalling devices 53 and acoustic signalling devices 54, printers 55, modems 56, automatic telephone number dialers 57, remote control actuators 58 etc.

The inputs of the processing system 51 are connected to the pins 2, 5 and 9 of the connector 12.4, and one output of the system is also connected to the pin 10 of the same connector 12.4.

The operation of the apparatus according to the invention is described hereinafter on the assumption that one or two transmitting apparatus (not shown on the drawings) exist for transmitting coded messages for remote control and remote information functions.

Under rest conditions the battery 59, with which the section A is provided, powers the unit A1 by way of the pin 1 of the connector 21.1 and at the same time feeds a voltage signal to the unit A3 by way of the pin 6 of the connector 21.3. Assuming that an ON signal is present at the pin 3 of the connector 21.1, the switch 22 allows the voltage stabilizer 23 to be powered. In this manner, the unit A1 is able to receive through the antenna 13 any coded messages transmitted by one or more transmitting apparatus, amplify them, filter them, detect them and reconstitute them before making them available at the pin 7 of the connector 21.1.

As stated, the unit A2 comprises the subunits A2.1, A2.2, A2.3 and A2.4, which in the illustrated embodiment are shown as four in number, but could also be of greater number and could be suitably multiplexed.

The logic signal trains originating from the pin 7 of the connector 21.1 are fed through the pin 2 of the connector 21.2 to the non-volatile memories 33 and 37, where they are compared by comparators (not shown) with the sequences memorized therein and, if recognised as coinciding with one of these, are fed to the logic signal ordering circuits 34 or 38 and, after amplification in 35 or 39, are made available at the pin 1 or 4 of the connector 21.2. Obviously, only those codes recognized by the memories 33 or 37, and no other code, can be present at these pins in the form of amplified logic signals.

The subunit A2.3 is also provided with the rectifier 36, which provides at its output, at the pin 5 of the connector 21.2, a high (or low) logic signal if an overall train which has been recognised by the memory 33 is present.

As already stated, the stated number of subunits A2.3 and A2.4 is by way of example only, and in reality this number could also be greater.

The subunit A2.2 is similar to the subunit A2.3, and differs from it in that the memory 29 performs the function of recognizing a code inserted in the form of logic signals directly through the pin 6 of the connector 21.2 and returning to the pin 7 a high or low logic signal denoting recognition or non-recognition of the inserted code by the memory 29.

Again with regard to the subunit A2.2, this has been shown as a single entity but in reality it could be in the form of several constuctionally and functionally identical subunits arranged to recognise different coded messages.

The purpose of the subunit A2.1 is to read the memories 33 and 37 of the subunits A2.3 and A2.4 respectively, when commanded by a signal fed to the pin 8 of the connector 21.2.

As stated, the section A is provided with two chargeable groups of batteries 40 and 59 which are cyclically recharged. This recharging is effected by applying a source of external energy to the pin 1 of the connector 11 or, in other terms, by inserting the connector 11 which is rigid with the section A into a corresponding connector of another suitable apparatus (for example B3), with the function of providing the pin 1 with the necessary electrical energy.

At the amount of connection, there is therefore voltage present at the input of the diodes D1 (having its output connected to the pin 1 of the connector 21.1 of the units A1) and D2 (having its input connected to the pin 7 of the connector 21.3 of the unit A3). The voltage at the input of D2 is also fed to the input of a contact breaker 60 of A3 and to an AND gate 61 of A3. The contact breaker 60 is arranged to provide at the pin 5 of the connector 21.3 a set signal if voltage is absent at its input (i.e. at the pin 1 of the connector 11). The AND gate 61 is arranged to provide a high signal to the pin 4 of the connector 21.3 if high signal is present at its inputs, i.e. at the pins 2 and 7 of the connector 21.3. By this means, if a coded message from another apparatus enters at the pin 6 of the connector 21.2, and this signal is correctly recognised bythe subunit A2.2 of A2, there is present at the pin 7 of 21.2 a high signal which, if voltage is present at the pin 7 of 21.2, gives at the output of the AND gate 61, i.e. at the pin 4 of 21.3, the OFF signal which deactivates the switch 22 of A1. In other words, the switch 22 of A1 is activated only if recharging voltage is absent at the pin 1 of the connector 11, and instead is deactivated if voltage is present at that pin, with the simultaneous recognition by the subunit A2.2 of A2 of a coded message which has entered through the pin 7 of the connector 11 (and thus through the pin 6 of the connector 21.2) from another apparatus connected to A.

The set signal of the contact breaker 60 also activates an AND gate 62, a NAND gate 63 and the counter C3 of the unit A3. The purpose of the counter C3 is to signal, on request, the period of activity of the apparatus starting from the moment in which the charging voltage of the batteries 40 and 59 is absent, for the double purpose of providing a positive indication of this event, and of indicating the residual active life of the batteries themselves.

If the absence of the recharging voltage should persist and the main internal battery slowly discharges, the voltage signal which this feeds to the pin 6 of 21.3 is fed to the comparator 64 of A3, which, in the case of deviation from the preset value, feeds a signal to the counter C4 of A3, to an optical signalling device 65, to an acoustic signalling device 66 and to the pin 8 of the connector 21.3 for any use external to the section A.

At the moment of activation of the apparatus, the voltage signal present at the pin 6 of 21.1 is fed via pin 3 of 21.3 to an input of the NAND gate 63, which is timed. If after a predetermined waiting time the signal from pin 5 of 21.2 indicating recognition of the coded message by the subunit A2.3 is not present at the other gate input, the NAND gate 63 activates the counter C2 and at the same time activates the optical signalling device 67 and acoustic signalling device 66. This function characterises the apparatus because it enables the absence of a message to be detected, this absence indicating either malfunction of the message emitter or emitters, or malfunction of the message receiver (unit A1).

In contrast, if within the preset time the signal recognised by the subunit A2.3 reaches the NAND gate 63, this gate is deactivated, a sign of correct operation of the apparatus.

The same signal recognised by the unit A2.3 is also fed directly to the counter C1 of A3, for chronological recording of the effected recognition, and at the same time is also fed to an input of the AND gate 62, which is timed with a waiting time exceeding that of the NAND gate 63. Consequently the recognition signal corresponding to the effected activation of the section A is "covered" by the waiting time of this AND gate 62, and a subsequent identical signal recognised by the subunit A2.3. of A2 and corresponding to a positive indication of the event being monitored, activates the counter C2, the optical signalling device 67 and the acoustic signalling device 66, and at the same time feeding a signal to the pin 8 of 21.3 for possible external use.

From the foregoing description it is apparent that the section A is essentially able to signal and chronologically record events of major interest, such as:

the moment in which the battery recharging voltage ceases and thus the activity of the apparatus commences (counter C3);

the moment corresponding to the end of the waiting period of the NAND gate 63, which has passed without the recognised signal having been received through pin 1 (counter C2);

the moment in which the coded signal has been recognised confirming correct operation of the transmitting apparatus controlled by the event to be detected, and of the receiving unit A1 (counter C1);

the moment in which any coded message is received subsequent to the waiting time of the AND gate 62 (counter C2);

the moment in which the voltage of the main battery 59 falls below the predetermined value (counter C4).

More signalling devices and/or counters can obviously be provided in the unit A3 for a more complete checking of remote events to be monitored.

The functions heretofore described regard the section A in the sense that they relate to the monitoring of correct operation of the apparatus and/or of messages or signals which it receives directly or by airwave transmission and/or which are self-generated, within either predetermined or random times.

However, the apparatus according to the invention is also able to perform further important functions if connected to external apparatus indicated by B1, B2, B3 and B4, which are described individually hereinafter in terms of their operation. Any one of the units B1, B2, B3 and B4 would be connected to the connector 11 of the section A by means of their connectors 12.1, 12.2, 12.3 and 12.4, which have equal pins in terms of number and distribution.

The unit B1, to which the section A can be connected, has the function of checking coincidence between two signal trains, and to emit two different signals according to whether coicidence has been detected.

The signal propagated by electromagnetic radiation from one or more emitters is received and decoded separately by B1 and by A. However whereas B1 receives and decodes all messages characterized by a prearranged composition with recognizable start and stop signals, the section A receives the messages and identifies them in terms of contents "before" retransmitting them externally through the pin 2 of the connector 11.

Consequently two messages enter the comparator 44 of the unit B1, namely, a decoded message originating from the receiver 42 of B1 and a decoded and recognized message originating from the subunit A2.4 of A, by way of the pin 1 of 21.2, the pin 2 of 11 and the pin 2 of 12.1.

The messages received by the unit B1 can also be memorized in the recorder 43, for use in the comparator 44 in deferred times in addition to real time, and to obtain in this manner a stable documentation regarding the messages received by B1 (and any coincidence with the message received and identified unequivocally by the section A).

The unit B2, to which the section A can be connected, has the function of transducing into output electrical signals the control signals fed to its input through the pin 2 or 5 of the connector 11.

The coded message received by A1 is fed via pin 2 of 21.2 to the subunits A2.3 and A2.4. If recognition is effected by one or the other, the corresponding recognized signal is fed through the pins 2 or 5 of the connectors 11 and 21.2 to the decoders 45 and 46, amplified in 47, for activating the scheduled apparatus.

Obviously this remote control function, which provides for the previous recognition of the received signals, can without doubt be considered unequivocal.

The unit B3, to which the section A can be connected, performs the functions of power supply, mutual recognition and deactivation of the section A, and confirmation of recognition or non-recognition.

As described heretofore, the section A automatically starts to operate when the recharging voltage of the internal batteries 40 and 59 is absent, and is deactivated by the simultaneous presence of said voltage and a high signal at the pin 2 of the connector 21.3. Consequently, after the code generator 49 of B3 has generated a signal, if it is recognized by the subunit A2.2, it generates a high signal at the pin 7 of 21.2, this signal on the one hand deactivating the section A by way of the pin 2 of 21.3, the AND gate 61, the pin 4 of 21.3, the pin 4 of 21.1 and the switch 22, and on the other hand returning to the unit B3 via the pin 8 of 11 for comparison with the signal generated by 49, with indication of coincidence or non-coincidence, and for possible external use.

The unit B4, to which the section A can be connected, performs the function of monitoring an automatic data processing center.

In this case, the signals generated by the unit A3 are fed to the unit B4 via the pins 8 of 21.3 and 9 of 11. These signals are used by the unit B4 both in order to display indications of malfunction or abnormalities, and to proceed to the remote transmission of processed signals originating from information from the section A.

The unit B4 also has the function of reading the codes contained in the memories 33 and 37 of A2. For this purpose the control unit 51 feeds a train of signals via the pin 10 of 11 and the pin 8 of 21.2 to the counter 27 of A2, which in turn feeds them to the register selector 28, which is itself arranged to read the memories 33 and 37.

The result of this reading is fed, in the form of a logic code, to the pins 2 and 5 of the connector 11 and from here to the processing centre 51, which comprises means for displaying, printing and externally utilizing the results of the processing of the received signals.

I claim:

1. An electric communication apparatus comprising:
information processing means including,
 receiver means for receiving coded messages from a message source,
 first decoder means, responsive to said receiver means, for decoding said coded messages and providing output signals at an output node corresponding to decoded messages, said first decoder meas including memory means for storing a plurality of coded messages capable of being received, and means for comparing said stored messages with said messages received from said message source, said output signals being indicative of a coincidence therebetween,
 monitor means for monitoring the correct operation of said information processing means,
 power supply means for powering said information processing means, and
 integral containment means for housing said receiver means, first decoder means, monitor means, and power supply means, said containment means including an input/output port having predetermined connections with said receiver means, said output node of said first decoder means, said monitor means and said power supply means; and
a plurality of secondary units selectively connectable to said input/output port of said information processing means, including,
 a confirmation/documentation unit including second decoder means for receiving and decoding a coded message from said message source, means for storing said decoded message, said comparator means for comparing said decoded message with a corresponding message provided by the output signal produced by said first decoder means to indicate the coincidence or non-coincidence thereof,
 a remote control unit including means, responsive to said output signals from said first decoder means, for activating selected apparatus in accordance with said output signals, and
 a monitoring unit including means, responsive to said output signals from said first decoder means, for optically or acoustically indicating the occurrence of a predetermined condition at said message source in accordance with said output signals.

2. An apparatus as claimed in claim 1, wherein said power supply means comprises a plurality of rechargeable batteries, said plurality of secondary units further comprising:

a power unit for recharging said plurality of rechargeable batteries, including means for providing a signal to said monitor means when said batteries are being recharged, for deactivating the power supply means from powering said information processing means.

3. An apparatus as claimed in claim 2, wherein said monitor means further comprises a circuit for comparing the voltage of the rechargeable power batteries with a predetermined voltage, said circuit comprising signalling devices which are activated when the said battery voltage falls below said predetermined voltage.

4. An apparatus as claimed in claim 2, wherein said monitor means comprises a counter for chronologically recording the termination of said power unit providing recharging voltage for the batteries.

5. An apparatus as claimed in claim 2, wherein said monitor means comprises a counter for chronologically recording the occurrence of a reduction in the supply voltage of the batteries below a predetermined threshold value.

6. An apparatus as claimed in claim 1, wherein said monitor means comprises a counter for chronologically recording the recognition of a received coded message.

7. An apparatus as claimed in claim 1, wherein said monitor means comprises a counter for chronologically recording the recognition of a received message after a predetermined waiting time.

8. An apparatus as claimed in claim 1, wherein said monitor means comprises a counter for chronologically recording the non-recognition of a received message within a predetermined time.

9. An apparatus as claimed in claim 1, wherein said monitoring unit comprises a system for the processing, monitoring, recording and indication of signals denoting recognition of the coded messages received from the first means via said input/output port.

* * * * *